William R. Bryant
INVENTOR.

Dec. 17, 1963 W. R. BRYANT 3,114,175
PROCESS AND MEANS FOR CONTROLLING THE MOISTURE REGAIN
AND MOISTURE CONTENT IN SEED COTTON
Filed Feb. 26, 1960 3 Sheets-Sheet 3
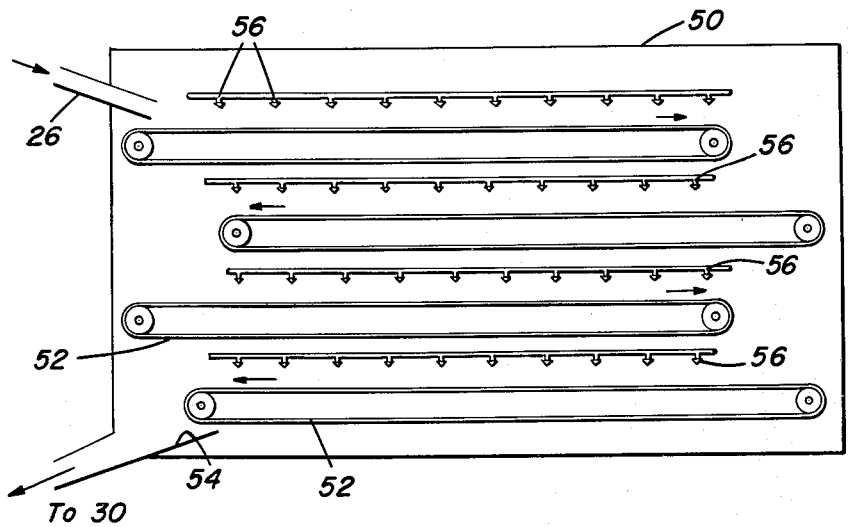
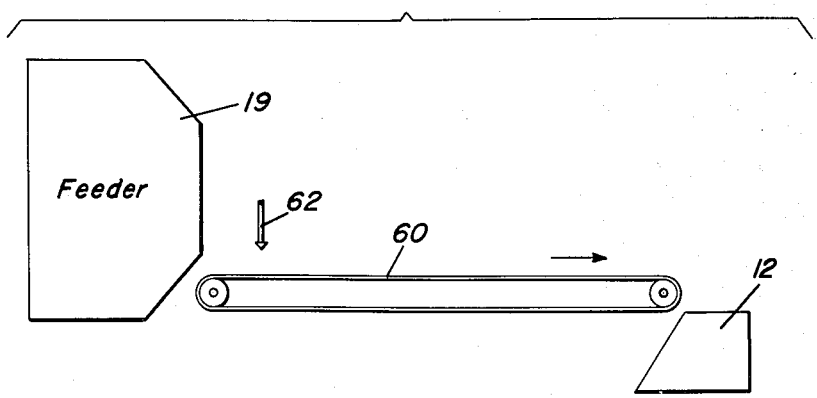
William R. Bryant
INVENTOR

United States Patent Office 3,114,175
Patented Dec. 17, 1963

3,114,175
PROCESS AND MEANS FOR CONTROLLING THE MOISTURE REGAIN AND MOISTURE CONTENT IN SEED COTTON
William R. Bryant, 828 W. Strawn, Jonesboro, Ark.
Filed Feb. 26, 1960, Ser. No. 11,265
5 Claims. (Cl. 19—66)

This invention comprises a novel and useful process and means for controlling the moisture regain and moisture content of seed cotton and more particularly relates to the obtaining of an optimum moisture content within both the cellular structure of the seed cotton fiber and in the seeds thereof before their separation in the ginning of the cotton.

It is now generally well known that different moisture contents within the cellular structure of the fibers of the seed cotton are necessary in order to obtain the most desirable results in the cleaning of the cotton prior to the ginning operation and in the ginning operation itself. In particular, the desirable moisture content for the most effective cleaning of the seed cotton fibers is less than the moisture content desired for the ginning of the seed cotton. It is generally accepted in the industry than an exhaustible moisture content by weight in the seed cotton fibers of from 4% to 7% in the cleaning operations and of from 7% to 10% in the ginning operation is the optimum or preferred condition. It should be recognized, however, that these ranges, now generally accepted by the industry are actually compromises arising from and being necessitated by an adherence to the basic principle of conventional practice of maintaining a constant, uniform and continuous rate of flow of the cotton through both the cleaning and ginning operations of the entire gin plant. It is my belief, however, that if the rates of flow of the seed cotton through the cleaning and ginning operations are made independent of each other that the above quoted generally accepted optimum moisture content ranges may be drastically revised with an improvement in the efficiency of each operation.

Modern practice is to dry the cotton fibers preparatory to and during the cleaning operations performed thereon. While this treatment is effective in enabling an adequate cleaning of the seed cotton fibers, it has heretofore invariably resulted in the fibers becoming overdry in order to insure adequate drying, so that they suffer during the cleaning operation some damage to their characteristics and commercial desirability. Further, after the cleaning is completed, the fibers are deficient in that moisture content which is necessary for effective ginning of the fibers so that the fibers, which are now overdried with respect to the desired moisture content of the fibers for ginning, are extremely brittle, resulting in considerable breakage of the fibers in the ginning machinery during the ginning operation.

This condition, now prevelant in the ginning industry, has been recognized and numerous efforts have been made to overcome or correct the same. Chief among these efforts has been the attempt to add moisture directly to the seed cotton and cotton fibers during the course of the passage of the fibers through a ginning plant. However, such efforts have fallen far short of success particularly when seed cotton of unusually high or unusually low moisture content is delivered to the ginning plant.

Efforts to introduce additional moisture into the seed cotton fibers during their passage through the ginning plant have resulted in some increase in the moisture content, but except under the exceptional condition of seed cotton fibers being presented at the plant so that little or no drying is necessary to perform the cleaning operation thereon, there has resulted damage or deterioration of the fiber qualities during the cleaning operation; and in any event, all such fibers, after being dried for cleaning, are too low in moisture content to be ginned to the best advantage. Prior attempts to increase the moisture content preparatory to passing the seed cotton after cleaning through the ginning process have been generally ineffective. If sufficient moisture is added in an attempt to compensate for the moisture deficiency therein, the surface of the seed cotton fibers is unduly wet, and will tack or stick to surfaces of the cleaning machinery resulting in poor ginning conditions and in a decidedly inferior product.

As the basis for this invention, I have found that difficulty arises from the fact that modern ginning methods in order to effect efficient use of the ginning machinery are based upon and require a continuous uninterrupted steady flow of the cotton through the entire cotton treating machinery of the ginning plant. Any interruption to this flow has been heretofore universally considered as uneconomical, involving a waste of time and use of the machinery of the plant.

It is well understood that an exhaustible moisture content by weight of from 11% to 13% in the cotton seeds is highly desirable resulting in maximum viability or germination of the seeds. Further, the increased weight of the seeds having this high moisture content, relative to the weight of the seed cotton fibers is reflected in a better performance and efficiency of the ginning operation.

However, it now appears that the rate of moisture absorption by the seeds, when still attached to the seed cotton fibers as they are before the ginning operation, is less than that of the seed cotton fibers themselves. More time is therefore required to effect a given moisture regain in the cotton seeds than in the fibers, thereby introducing the time element into the problem of moisture regain.

An important feature of this invention is that adequate time is available to obtain the desired moisture regain and content of both seeds and fibers of the cleaned seed cotton since rates of flow of the seed cotton through the cleaning and ginning operations of the plant are or may be completely independent from each other and are no longer inseparable and interdependent components of a process requiring a continuous uniform flow of the cotton throughout.

The concept of this invention is predicated upon the recognition of the fact that a considerable time is required for moisture applied to the exterior surface of cotton seed and the seed cotton fibers to be absorbed into and penetrate the cellular structure of the fibers or into the seeds and thus produce the desired moisture regain and moisture content to impart to the fibers and seeds their optimum characteristics. An important feature of this invention is the provision for any necessary time interval after cleaning and before ginning to effect any desired extent of moisture regain.

In order to carry out the basic concept of this invention, I propose to interrupt or halt the direct flow at a uniform rate of the seed cotton in the drying and cleaning equipment of the ginning plant from its immediate passage to the ginning process and instead, to thereupon immediately apply moisture to such seed cotton fibers and then place such seed cotton fibers when moistened in storage for a sufficient period of time to enable the applied moisture to be absorbed into the cellular structure of the seed cotton fibers and into the seeds and thus obtain the desired final moisture content of the seed cotton fibers and seeds before they are then introduced into the ginning process of the plant.

As a result of this method, regardless of the moisture content in both the fibers and seeds of the seed cotton after the cleaning operations have been performed thereon to the extent desired, the seed cotton is stored and is not delivered to the ginning equipment until its cellular structure has had a moisture regain sufficient to impart to the fibers and seed the desired characteristics. As a consequence, there results from the ginning operation lint cotton of the maximum staple length with a minimum of damage to the fibers and with minimum hazards to the ginning equipment.

It is therefore the primary purpose of this invention to provide a process and means to effect a moisture regain and to obtain a moisture content within the cellular structure of the seed cotton fibers and as a corollary within the seeds themselves prior to the introduction of the seed cotton into the ginning equipment.

It is a further and more specific object of the invention to provide a process and a means which will temporarily interrupt the conventional continuous flow of seed cotton through the cleaning and drying apparatus of a ginning plant and to and through the ginning equipment and after applying moisture to the exterior of the seed cotton fibers, to then hold the seed cotton in storage for a sufficient length of time to enable the applied moisture to be absorbed into the cellular structure of the seed cotton fibers and of the seed itself and thus effect the desired moisture regain and content thereof; and thereafter to then deliver the seed cotton having the desired optimum moisture content to either further cleaning or treating operations and then to the ginning equipment or instead directly to the latter for the ginning operation thereon.

A further important object of the invention is to devise a process and means which will break the continuity between and enable an efficient separation of the drying and cleaning operations and the ginning operations whereby the two operations may be each performed at the desired or optimum moisture content in the fibers and seeds for each and under conditions in which the rate of flow of cotton in one operation is independent of that through the other operation; and whereby a controllable period of time of storage is provided for the seed cotton which in turn is independent of the rate of flow of the seed cotton through the cleaning and drying operations and the rate of flow of the seed cotton through the ginning operations.

Another important advantage arising from this invention is that it also permits the ginning of cotton by a process in which the cleaning operations and the ginning operations may, if desired, be integrated into a single continuous process but with a controllable, variable time lag between the emergence of the seed cotton from the cleaning equipment and its introduction into the ginning equipment. This controllable time lag is of any desired duration sufficient to effect any desired treatment, handling or inspection of the seed cotton including especially the effecting of a controlled moisture regain and content in the fibers or seeds which constitutes the basic purpose of this invention.

The ability to obtain any desired time lag is predicated upon the provision of ample storage or reservoir space to receive and store the accumulated seed cotton flowing continuously from the cleaning equipment until after the desired time lag it is fed in continuous flow to the ginning equipment.

It is therefore a very important object of this invention to provide a process for the continuous processing of cotton through a gin plant which will yet afford a controllable time lag between the passage of the seed cotton through the cleaning equipment until its introduction into the ginning equipment.

In order to effectively clean seed cotton in modern cleaning equipment it is necessary to thoroughly dry the seed cotton before the trash and foreign matter can be removed from the fibers. This necessarily results in simultaneously drying the foreign matter also, so that frequently the weight differential between the cotton fibers and the foreign matter which is largely relied upon in the operation of centrifugal and other types of cleaners in the cleaning of the cotton disappears or is so reduced as to render it practically impossible under this condition to further clean the cotton. This detrimental condition is further increased by the static charges built up upon the dried cotton fibers which cause the trash to cling more closely to the dried fibers.

The above set forth problem attending the prior practice of cleaning cotton may be largely overcome by the present invention. It is therefore a further important purpose of this invention to provide a process and means which will facilitate and render more efficient the cleaning of seed cotton by dissipating static charge accumulations upon the dried fibers and by restoring moisture content to the trash thereby restoring the weight differentiation between the trash and cotton fibers which is a necessary condition for the operation of centrifugal and other types of cotton cleaners.

A further complicating factor in the operation of a ginning plant is that there is a variation in the most efficient relative operating rate of the cleaning and ginning equipment throughout the ginning season. For example, cleaner cotton brought from the field can be processed in the cleaning and drying equipment much faster than it can be ginned. Conversely, the trashier cotton can be ginned much faster than it can be cleaned. This condition produces an unbalance between the cleaning and ginning equipment resulting in less efficient use of one or the other. Such unbalance sometimes runs as high as 100% either way. This difficulty is readily overcome by the present invention which enables the securing of a complete independence of the cleaning and ginning operations.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a diagrammatic view showing a further means for carrying out the processes of this invention by live storage; and FIGURE 4 is a diagrammatic view of a simplified modified process of this invention.

Figure 1:
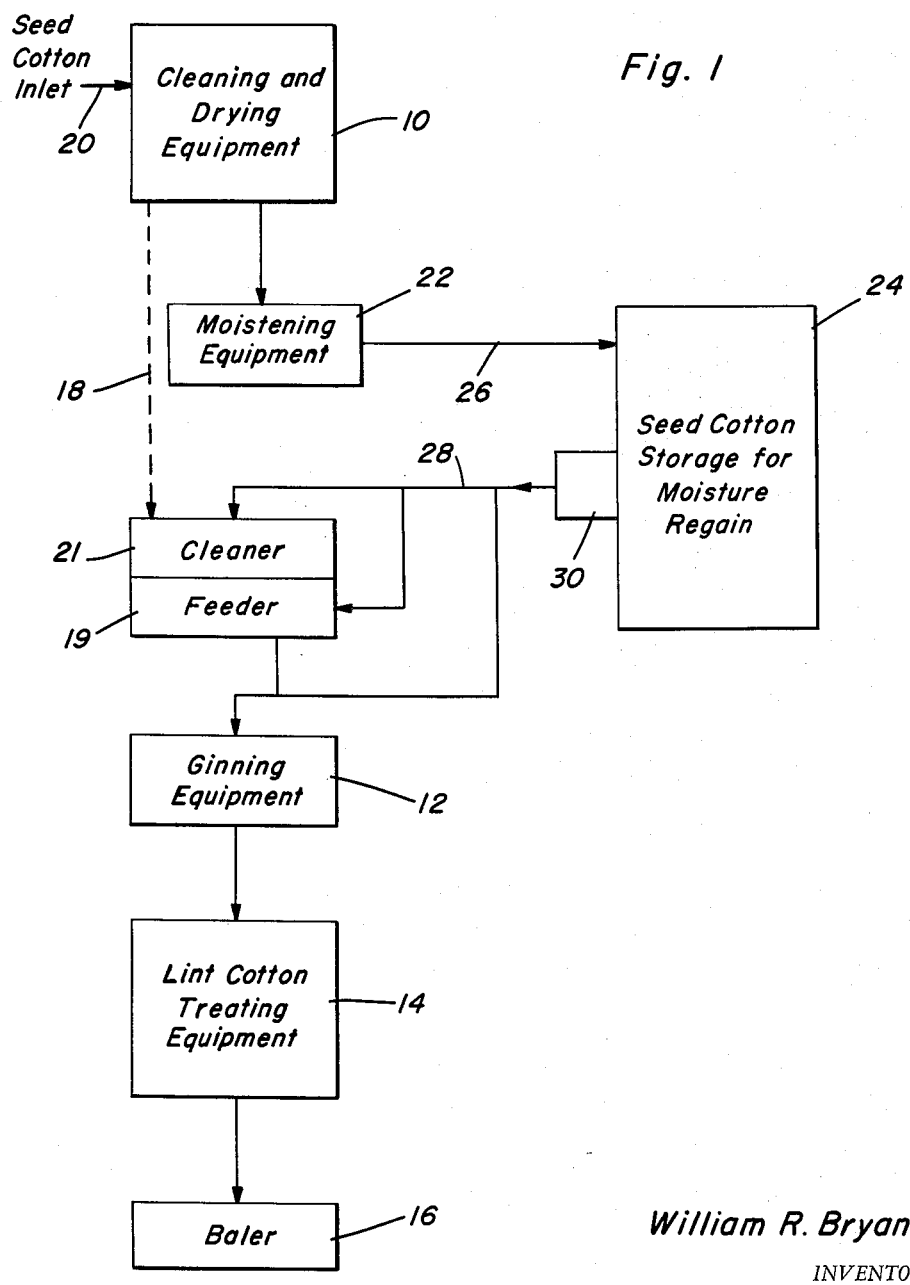
FIGURE 1 is a diagrammatic representation by a flow diagram of the process in accordance with this invention and its appplicability to a ginning plant.

Insofar as the principles of this invention are concerned, all of the operations performed upon the seed cotton and all of the equipment provided for effecting the cleaning and drying thereof from the time the seed cotton is delivered into the plant until the cleaned seed cotton is ready to be ginned except for the question of moisture regain is now diagrammatically represented by the numeral 10. Indicated by the numerals 12 is the ginning machinery of the plant by which the cleaned seed cotton is customarily ginned for separation into cotton seed and lint cotton and thereafter delivered to the various subsequent operations to be performed thereon by the lint cotton treating equipment of all character, as indicated generally by the numeral 14. From this last mentioned equipment, the lint cotton goes to the baler 16 and the treatment of the seed cotton in the ginning plant is thereupon completed. The seeds, now separated from the fibers are recovered for various commercial uses.

In the conventional process of ginning in a cotton ginning plant, it is customary to perform the cleaning and drying operations of the equipment 10 as a part of a continuing process or flow and to directly deliver the cleaned and dried seed cotton as by the dotted line of flow passage shown at 18 into the cleaners and feeders 19 and 21 and from thence into the ginning machinery 12. There is thus a continuous operation upon and a continuous travel of the seed cotton from the time it enters the plant as indicated by the flow inlet arrow 20 to the time it emerges from the baler 16. Usually this entire travel of the seed cotton through the drying and cleaning equipment until it enters the ginning equipment is effected in about 30 seconds, while the time of travel through the ginning machinery 12 is only a very few seconds, which has heretofore proved to be quite insufficient for moisture regain to the desired moisture content for ginning. Consequently, the speed of operation of the various equipment and the time during which the cotton fibers whether seed cotton or lint cotton pass through this equipment is also so interrelated that they are mutually dependent upon each other. Therefore, any delay or interruption from this continuous flow seriously and detrimentally affects the efficiency of operation of the ginning plant as a whole. Although it is well known that the rate of flow of the seed cotton to the cleaning and drying equipment is not uniform throughout all portions thereof and certainly is not the most effective rate of flow of the seed cotton through the ginning equipment at all times and/or through the lint cotton treatment equipment 14, it has been heretofore necessary to maintain a continuous rate of flow, which compels compromises with the optimum conditions.

In accordance with this invention, it is possible to maintain the conventional conditions as to treatment of the seed cotton and the flow of the seed cotton through the cleaning and drying equipment 10; and likewise to maintain the conditions conventionally desired for passage of the seed cotton through the ginning equipment 12 and through the lint cotton treatment equipment 14. The improvement and novel process in accordance with this invention consists in the introduction into this process after or during the cleaning and drying operations and before the ginning operation the step of applying moisture to the seed cotton by moistening equipment as indicated at 22; and thereupon the subsequent storage of the moistened seed cotton as a separate and distinct step and by a separate means as at 24 for a sufficient period of time to effect the desired moisture regain and moisture content within the cellular structure of the fibers and within the seed to bring the seed cotton to optimum moisture content, or for other reasons, in preparation for efficient ginning of the same in the ginning equipment.

By the step of withdrawing the seed cotton from direct flow to the ginning equipment and storing it for a sufficient period of time, adequate time can be provided to enable the moisture applied by the equipment 22 to be absorbed into the cellular structure of the fibers and into the seed and thus effect the desired moisture regain and content thereof. Consequently, the cleaned or partially cleaned and moistened seed cotton after introduction into the storage 24 through the flow line 26 is then retained in storage for a sufficient length of time for the desired moisture regain and content and is then delivered by the flow line 28 to the cleaners 21 and/or feeders 19 and/or to the ginning equipment 12 whereupon the ginning operation and the subsequent lint cotton treating operations are performed in the conventional manner.

At this point it should be understood that the added steps of moistening the seed cotton prior to its delivery to the ginning equipment and the storing of the moistened seed cotton for a sufficient period of time for the desired amount of moisture regain is the essential feature and improvement of the present invention. Moreover, this essential feature and concept of this invention is not limited in any way by the types and character of cleaning and drying equipment or by the various operations performed thereby; nor is it in any way limited by the ginning operation or the lint cotton treating operations and the equipment for performing the same.

Although it is deemed to be most satisfactory for the purpose of this invention to effect the moistening operation after the seed cotton has completed its passage through the cleaning and drying equipment, it will be understood that in some instances this moistening operation may be effected in part at least during various steps of the cleaning and drying operations. In any event, however, sufficient additional moisture is applied to the seed cotton fibers so that when the cleaning and drying operations are completed, there is adequate moisture applied to the surfaces of the fibers for absorption into the cellular structure of the same and into the seeds.

It should be noted that cotton is never completely cleaned in a ginning plant. Even after the lint cotton is baled, it is subsequently subjected to further cleaning operations in the textile plant. It is however customary to clean the cotton in the cleaning and drying equipment as much as permitted by the capabilities of such equipment.

Contrary to usual theory, I have found that some moistening of the seed cotton, before the completion in the plant of the steps of cleaning, is beneficial. For example, the step of moistening tends to dissipate static accumulation which hinders the separation and expulsion of foreign matter from the seed cotton.

Further, in the cleaning, and drying operations, some foreign matter when dried becomes of comparable specific gravity to that of the seed cotton fibers and as pointed out above is difficult to remove. The moistening operation also effects moisture regain of the foreign matter while dissipating static charges, restoring the weight differentiation from the fibers whereby further cleaning steps will be effective in expelling further foreign matter.

Therefore, the present invention contemplates and comprehends the introduction or applying of moisture to the seed cotton either upon the completion of all cleaning operations preceding ginning or at any stage during the cleaning operations where beneficial results can be obtained. Usually, I prefer to apply moisture and store the seed cotton after the major cleaning and drying has been completed and the seed cotton would ordinarily then pass into the ginning equipment.

One satisfactory manner for obtaining this result is to directly subject the free falling stream of seed cotton, after the latter emerge from the cleaning and drying equipment, to a moisture spray or vapor in the form of steam, mist, fog, moisture suspension or the like in order to thereby thoroughly coat the surface of the fibers with sufficient moisture for the purpose intended.

In some instances, the applying of the moisture to the fibers may be effected in whole or in part by conveying the fibers in a sufficiently moist airstream as the latter flows to the storage means 24. Further, in some instances, there may be a continuous moistening of the fibers when they emerge from the cleaning and drying equipment 10 until the fibers reach the storage 24; or I may continue the moistening step after the fibers are in storage; or even perform the step of moistening after the seed cotton is in storage, it being only necessary that before the seed cotton is discharged from the storage through the flow conduit 28 that it shall have achieved the desired moisture regain and content within the cellular structure of the fibers and as a corollary, in the seeds themselves.

It is within the purview of this invention to employ any type of storage of the moisture coated seed cotton fibers received from the delivery or input supply means 26 into the storage or reservoir means 24. Thus, the fibers may be retained in a stationary condition or in dead or immobile storage; or may be retained in a continuously moving condition or in a live or mobile storage for the desired period of time.

I have found from experiments that if moisture is applied to the exterior surface of a mass of seed cotton fibers, and such fibers are then piled upon themselves or stored in layers and masses, that the surface moisture will be eventually absorbed into the cellular structure of the fibers and into the seeds. Consequently, a satisfactory dead or immobile storage method in accordance with the principles of this invention includes the step of storing the moistened seed cotton fibers upon themselves in layers or masses in hoppers, carts, shelves, or the like for the required length of time to permit the absorption of the surface moisture into the cellular or internal structure of the fibers and into the seeds.

As a corollary to this method, the fibers thus stored may be subject to agitation or to currents of moist and/or heated air for the purpose of securing a more uniform application of the surface moisture over all of the surface of the individual fibers and thus effect a more rapid penetration of the moisture into the internal structure or cellular structure of the fibers and into the cotton seeds.

It may be found preferable in some instances to employ what I term "live or mobile storage" of the moistened fibers for a sufficient length of time to enable the surface moisture to be absorbed into the cellular structure of the fibers and into the seeds. Various types of live storage can be employed. Examples of satisfactory live storage are conveyor systems upon which a layer or layers of seed cotton are continuously transported about the interior of the storage chamber or chambers for the sufficient length of time to effect the desired moisture regain and content in the cellular structure of the fibers and seeds. This action may be accompanied by circulation of moistened air, maintaining of a moist atmosphere within the storage or reservoir chambers, agitation of the seed cotton and the like.

Further, a traveling circulation system can be employed in which the seed cotton is caused to fall through a tortuous path of travel or to be conveyed along a tortuous path of travel being thrown back and forth by baffles during such travel either in the open or in an enclosure.

Still further, a system of trucks or cars or containers moving upon tracks, guides or roadways may be employed in which discrete masses or batches of the moistened seed cotton are transported either continuously or intermittently for a desired length of time for the moisture regain desired.

In all of these methods, whether dead storage or live storage, various aids to improve the rapidity and the thoroughness and uniformity of moisture regain of the fibers may be employed such as the previously mentioned agitation of the fibers, the maintaining of a moistened atmosphere for the fibers, the employing of air currents and the like may be employed.

As a corollary to this action for enhancing the moisture regain of the fiber and seeds, it is also possible to employ, as indicated at 30, a drying station to remove excess surface moisture which may not be absorbed from the fibers and seeds as they are discharged from the storage or reservoir means 24 through the delivery line 28.

In connection with the step of live storage of the moistened fibers, it may be desirable in some instances to have the fiber conveying means directly disposed beneath the moistening equipment 22. An advantage of this arrangement is that as the cleaned and dry cotton fibers are discharged from the cleaning and drying equipment, they are liberally coated with moisture by the moistening equipment 22, and fall directly into and are received in the containers or in a container forming a part of the live storage means for storing fibers in transit while in the moisture regain chambers 24.

Figure 2:
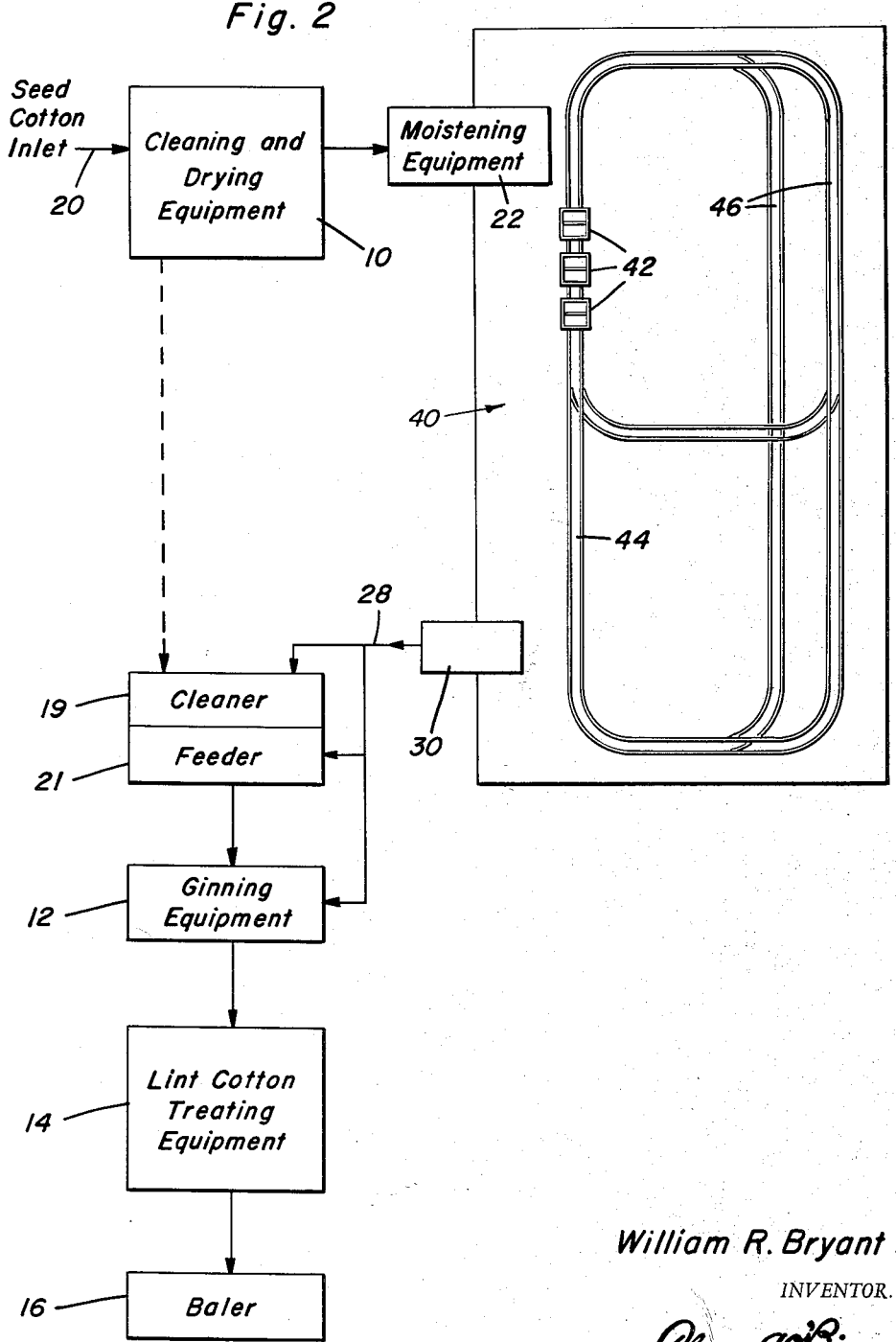
FIGURE 2 is a diagrammatic view similar to FIGURE 1 but illustrating a storage means which may be used for either live or dead storage of the cleaned and moistened seed cotton.

Referring now especially to FIGURE 2, there is disclosed in diagrammatic form a process in which the cleaned and moistened seed cotton may be retained as set forth hereinbefore in either live storage or dead storage. The same numerals designate the same elements and relations discussed in connection with the process of FIGURE 1.

In this arrangement, however, the storage means is designated by the numeral 40 and includes mobile containers such as the carts or trailers 42 each of which may be divided into compartments as to hold the requisite quantity of seed cotton to form a bale of lint cotton.

The carts 42 may be mounted upon a system of tracks 44 such that the carts loaded with moistened seed cotton may be progressed singly and step-by-step through the proper length of a path of travel, and at a desired rate so that each cart will remain in storage for the desired length of time before its contents, now having the desired moisture regain, is discharged through the flow line 28 to the equipment 19, 21 or 12.

The storage means 40 has sufficient capacity as for example the tracks 46 to maintain a reserve of seed cotton thereby compensating for any temporary changes in the relative rates of flow through the cleaning equipment 10 and the ginning equipment 12.

FIGURE 3 indicates diagrammatically the principle of live or mobile storage of the cleaned and moistened seed cotton. The storage means 50 receives the moistened seed cotton from the flow line means 26, the stream of cotton calling upon the endless conveyors 52 which are arranged in overlapping arrangement. As the seed cotton is deposited in a layer to the desired depth upon the top conveyor, it is moved to the end of the horizontal travel of the latter and is thus dropped and turned over upon the next lower conveyor. This operation is repeated until the seed cotton is delivered to a discharge chute 54 which supplies it to the element 30 and/or to the flow line 28.

Where desired moisture supplying header and nozzle assemblies 56 may be provided above the top two of any other of the conveyors to apply moisture to the surface of the layers of seed cotton. Thus each time the layer of seed cotton is turned over, additional moisture may be applied, if desired.

The moisture so applied may supplement that applied by the moistening device 22 or may be substituted therefor.

The time of storage of the seed cotton may be readily controlled by varying the number, length of travel and/or the speed of the conveyors 52.

A more simplified arrangement is shown in FIGURE 4 wherein a single conveying means 60 of any desired character is positioned between the feeder 19 and the ginning apparatus 12. A spray means 62 applies moisture either to the seed cotton on the conveyor or to the stream of seed cotton after it leaves the feeder 19.

The speed of the conveyor 60 will be controllable whereby to provide the necessary time for moisture regain. The advantage of this principle of this invention is that it requires merely the interposition of the conveyor 60 and spray means 62 between the conventional feeder 19 and ginning equipment 12.

It is desired to emphasize that the conveyor 60, as well as the previously set forth conveying means of FIGURES 2 and 3 may be of various types such as moving belts, chutes, and the like; and may be accompanied by agitating means or air circulating means in order to facilitate the rate and homogeneity of the moisture absorption.

Although it is preferred to divert all of the seed cotton to the moistening and storing means, it is also possible to improve the quality of the ginned cotton and seeds by diverting only a portion of the cleaned cotton. Thus part of the cleaned cotton could be permitted to continue its conventional travel to the ginning equipment by the flow line 18 while the remainder could be diverted, moistened, stored and then after a desired moisture regain therein had been achieved, would be delivered through 28 to mix with the undiverted seed cotton from 18 in the conventional cleaner-feeder installation 19, 21.

The operability of the principle of moisture regain in accordance with this invention has been clearly established by test. In an actual test, overdried and cleaned seed cotton with a moisture content of about 4½% was moisturized as it left the cleaning operation and was then stored arbitrarily in a stationary condition, without being handled or turned during storage and without air circulation or other means to facilitate the rate of moisture absorption for a period of about six hours.

Thereafter it was run through the conventional gin stand and performed perfectly during ginning. This performance would have been impossible for seed cotton of only 4½% moisture content. After ginning, the lint fibers were found to contain 8.4% moisture content showing a definite moisture regain during storage of 3.9%.

There also resulted an increase in the fiber staple length 2.025 inches as measured by the Fibrograph, a well known instrument commonly employed for determining average lengths of cotton fibers in this industry. The uniformity rate of the fibers as determined by this instrument was 2 points higher after the storage period than before. There was no significant difference in the fiber breaking strength or fineness as determined by the Micronair, an instrument commonly employed in fiber testing laboratories. These differences in the fiber characteristics obtained through the moisture regain process result in definite and substantial increase in the spinability and value of the fibers.

The foregoing test conclusively demonstrated the operability of this invention. Other tests are now being conducted to establish the requirements of time for moisture regain under varying conditions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In high speed cotton cleaning and ginning apparatus wherein field cotton is normally and conventionally introduced into the cleaning apparatus through which the cotton passes and is cleaned in less than a minute following which the cotton is immediately automatically fed to the ginning apparatus through which the cotton passes and the cotton fibers are separated from the cotton seed in less than a minute, all normally in a continuous operation of the cleaning and ginning apparatus with undiverted flow of cotton through the cleaning and ginning operations; a method of adding moisture to the cotton fibers which comprises the steps of introducing cotton having a moisture content less than the optimum for ginning into the cleansing apparatus, adding moisture to and diverting the cotton from its normal path through the high speed cleaning and ginning apparatus after at least partial cleaning of the cotton by the high speed apparatus, keeping the cotton out of the said normal path following the addition of moisture thereto to allow absorption of the moisture by the diverted cotton, and thereafter returning the diverted cotton to its normal path through the high speed apparatus for completion of the operations normally performed thereby including separation of cotton fibers from the seeds.

2. In high speed cotton cleaning and ginning apparatus that normally and conventionally operate substantially continuously at high speed upon cotton in such a way that whatever cotton is introduced into the apparatus is automatically conveyed at high speed by a conventional means through the apparatus and processed through the steps of cleaning the cotton and thereafter separating the lint from the seed with no substantial interruption in the cotton flow; the method of moisturizing the cotton prior to separation of the lint from the seeds comprising the steps of: continually operating the cleaning and ginning apparatus in the aforesaid conventional manner to the extent that the apparatus continuously performs its cleaning and lint-from-seed separating operations upon whatever cotton is in position for receiving these operations and the means to convey the cotton through the apparatus is continuously operated to convey any cotton that is there to be conveyed, introducing cotton into the high speed cleaning apparatus, allowing the introduced cotton to be conveyed by that portion of the conveying means that conveys the cotton through at least most of the cleaning operation, but diverting the cotton from the conventional conveying means prior to the cotton reaching the lint-from-seed separating operation, adding moisture to the cotton, withholding the thus diverted and moisturized cotton from the conventional conveying means while moisture is absorbed by the cotton fibers, and thereafter returning the diverted cotton to the conveying means at a point upstream of the ginning apparatus and allowing the conveying means to carry the cotton through the rest of the high speed apparatus for conventional processing including the operation of separating the lint from the seed.

3. In high speed cotton cleaning and ginning apparatus that normally operate substantially continuously upon cotton in such a way that whatever cotton is introduced into the apparatus is automatically conveyed by a conventional means through the apparatus and processed through the steps of cleaning the cotton and thereafter separating the lint from the seed with no substantial interruption in the cotton flow, the method of moisturizing the cotton prior to separation of the lint from the seeds comprising the steps of: continually operating the cleaning and ginning apparatus at a predetermined rate that can produce a high speed stream of cotton flowing through the apparatus including introducing the cotton into the cleaning apparatus in a relatively dry condition, causing the cotton to flow through the cleaning apparatus in the said high speed stream and cleaning it in its relatively dry condition, diverting the cotton from the high speed stream prior to the cotton reaching the lint-from-seed separating operation; adding moisture to the cotton; withholding the thus diverted and moistened cotton from the high speed stream for a period of time to enable moisture to be absorbed by the cotton fibers, and thereafter returning the diverted cotton to the high speed stream at a point upstream of the ginning apparatus, and causing it to regain its high speed, and causing the high speed stream of cotton to be ginned after the moisture has been absorbed.

4. In high speed cotton cleaning and ginning apparatus that normally and conventionally operate substantially continuously and at high speed upon cotton in such a way that whatever cotton is introduced into the apparatus is automatically conveyed at high speed by a conventional means through the apparatus and processed through the steps of cleaning the cotton and thereafter separating the lint from the seed with no substantial interruption in the cotton flow, the method of moisturizing the cotton prior to separation of the lint from the seeds comprising the steps of: continually operating the cleaning and ginning apparatus at speeds that can produce a high speed stream of cotton flowing through each including introducing a supply of cotton into the cleaning apparatus in a relatively dry condition; continually operating the cleaning apparatus to clean said supply of cotton and deliver it in a high speed stream; after said cleaning is completed, delivering the said cotton to the ginning apparatus and separating the seed from the lint therein at the said high speed; and prior to the ginning operation diverting the cotton from the high speed stream, adding moisture to the cotton, withholding the thus diverted and moistened cotton from the high speed stream for a period of time and thereby enabling the moisture to be absorbed by the cotton fibers; and thereafter returning the diverted cotton to the high speed stream at a point ahead of the ginning apparatus and causing it to regain its high speed and to be ginned as aforesaid.

5. In the process of ginning seed cotton in a cotton ginning plant which conventionally includes conveying cotton in a continuous high speed stream through the steps of cleaning the seed cotton and thereafter ginning the cleaned seed cotton, the improvement which comprises at least partially cleaning the cotton while its moisture content is below the desired moisture content for separating the cotton lint from the seeds, diverting the cotton from the high speed stream and applying moisture to the cotton after the step of at least partially cleaning is completed, withholding the moistened cotton from the high speed stream and storing it for a sufficient length of time to enable the applied moisture to be absorbed into the cellular structure of the said cotton fiber and the cotton seed until a desired moisture content in the cotton has been effected including increase in the moisture content thereof by at least one percent based upon the weight of the cotton, and then returning the cotton from storage to the high speed stream for the step of ginning cotton having the desired moisture content.

References Cited in the file of this patent

UNITED STATES PATENTS

| | | |
|---|---|---|
| 227,767 | Groom | May 18, 1880 |
| 2,019,079 | Herring | Oct. 29, 1935 |
| 2,067,497 | McCardle et al. | Jan. 12, 1937 |
| 2,158,752 | Fowler | May 16, 1939 |
| 2,747,234 | Speakes et al. | May 29, 1956 |
| 2,764,013 | Harrell | Sept. 25, 1956 |